US008757885B2

(12) United States Patent
Hornbach et al.

(10) Patent No.: US 8,757,885 B2
(45) Date of Patent: Jun. 24, 2014

(54) BEARING HOUSING OF AN EXHAUST-GAS TURBOCHARGER

(75) Inventors: Johannes Hornbach, Frankenthal (DE); Martin Becker, Malsch (DE); Oliver Schumnig, Gundersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/816,521

(22) PCT Filed: Aug. 19, 2011

(86) PCT No.: PCT/US2011/048373
§ 371 (c)(1), (2), (4) Date: Feb. 12, 2013

(87) PCT Pub. No.: WO2012/027212
PCT Pub. Date: Mar. 1, 2012

(65) Prior Publication Data

US 2013/0142465 A1 Jun. 6, 2013

(30) Foreign Application Priority Data

Aug. 24, 2010 (DE) ........................ 10 2010 035 279

(51) Int. Cl.
*F16C 3/14* (2006.01)
*F16C 3/16* (2006.01)
*F01D 25/16* (2006.01)

(52) U.S. Cl.
USPC ............ 384/316; 384/313; 384/381; 415/112

(58) Field of Classification Search
USPC ......... 384/316, 313, 381, 591, 593, 488, 504, 384/544, 551, 480, 449, 322; 415/111, 112, 415/229; 417/407; 464/7, 18
See application file for complete search history.

(56) References Cited

U.S. PATENT DOCUMENTS 5,915,843 A * 6/1999 Mattera ......................... 384/316

FOREIGN PATENT DOCUMENTS

GB 2126663 A * 3/1984
JP 01178723 A * 7/1989

* cited by examiner

*Primary Examiner* — Richard W Ridley
*Assistant Examiner* — Yamilka Pinero Medina
(74) *Attorney, Agent, or Firm* — William G. Anderson; Stephan A. Pendorf; Patent Central LLC

(57) ABSTRACT

A bearing housing (1) of an exhaust-gas turbocharger, having a compressor-side housing flange (2), a central housing section (3) which is integrally connected to the housing flange (2) and in which is arranged a first partial section (4) of an oil chamber (5) which has an oil inlet (20) and an oil outlet (21), and a turbine-side housing section (6) which has a turbine-side housing flange (7) and in which is arranged a second partial section (8) of the oil chamber (5). The central and turbine-side housing sections (3, 6) are provided with an oil cooling duct (13; 13').

14 Claims, 3 Drawing Sheets

BEARING HOUSING OF AN EXHAUST-GAS TURBOCHARGER

FIELD OF THE INVENTION

The invention relates to a bearing housing of an exhaust-gas turbocharger.

BACKGROUND OF THE INVENTION

A bearing housing of said type is known from DE 43 30 380 A1. The known bearing housing is divided into a bearing insert and a bearing dish which at least partially surrounds the bearing insert. Here, an oil chamber for cooling the bearings of the bearing housing is formed in the bearing insert, which is a cast part. Even though it is sought by means of said arrangement to attain a simplification in construction and production, the design of the bearing insert with the oil chamber is cumbersome because it results in a relatively complicated geometry which cannot be produced easily by casting. Furthermore, the cooling of the bearing housing and of its bearings has room for improvement.

SUMMARY OF THE INVENTION

It is therefore an object of the present invention to provide a bearing housing of an exhaust-gas turbocharger, which has improved cooling properties while having a simplified housing design.

Said object is achieved by a bearing housing of an exhaust-gas turbocharger. The bearing housing includes a compressor-side housing flange. The bearing housing also includes a central housing section which is integrally connected to the housing flange and in which is arranged a first partial section of an oil chamber which has an oil inlet and an oil outlet. The bearing housing further includes a turbine-side housing section which has a turbine-side housing flange and in which is arranged a second partial section of the oil chamber. The central and turbine-side housing sections are provided with an oil cooling duct.

As a result of the provision of an oil cooling duct, it is possible for the oil entering into the oil chamber to be used firstly for a supply to the bearing arrangement of the bearing housing. Excess oil can be introduced into the oil cooling duct, as a result of which an improved cooling action is attained in that more oil, which is not influenced in terms of flow speed and consistency (oil mist and oil foam) by the bearing arrangement, flows around a larger surface area.

If, in a particularly preferred embodiment, a bearing sleeve is provided which separates the oil cooling duct from the oil chamber, said bearing sleeve can be effectively shielded from the hot turbine side by the oil cooling duct. Furthermore, the oil quantity can be divided, and furthermore adjusted, between the functions of bearing lubrication and cooling. In this way, less oil passes to the dynamic seals, which improves the sealing action.

There is also a resulting improvement in acoustics as a result of the sound-shielding effect of the oil cooling duct and as a result of the damping of the bearing sleeve.

For manufacture, a correspondingly designed inner core may be provided. Sand removal from the bearing housing upper part is easy as a result of said large, easily accessible inner core.

In an alternative embodiment, in the case of a single-piece bearing housing, that is to say without an insertable bearing sleeve, the oil cooling duct is manufactured by means of corresponding core formation. Here, the oil cooling duct branches off from the oil inlet and leads at the turbine side directly to the oil outlet.

As in the first embodiment, there is the resulting advantage firstly that the need for a water-cooling arrangement is eliminated, wherein although the oil ducts or chambers used for lubrication and cooling should on the one hand be separate in order to ensure an oil supply to the bearing regions with not an excessive amount of oil (reduction of splashing losses), the wall thickness between the ducts (oil cooling duct and oil lubrication duct) may be small in order to reduce costs, because impermeabilities would not lead to failure of the bearing housing.

Therefore, particular advantages both of the first embodiment and also of the second embodiment are a cost reduction as a result of component simplification, a smaller installation space and a reduction in the oil throughput in the bearing arrangement core, which results in lower power losses and improved oil leakage.

The bearing housing of an exhaust-gas turbocharger can have additional advantageous features and arrangements. For instance, the oil cooling duct can be connected via an overflow to the oil chamber. The oil cooling duct can have three duct sections which run in a meandering fashion from the overflow to the oil outlet. In some instances, the oil cooling duct can branch off from the oil inlet and can open out into the oil outlet. In some instance, the oil cooling duct can be arranged annularly around the oil chamber. In some instances, a throughflow rate in the oil cooling duct can be determined by a cross-sectional area of the oil cooling duct.

BRIEF DESCRIPTION OF THE DRAWINGS

Further details, advantages and features of the invention will emerge from the following description of exemplary embodiments on the basis of the drawing, in which.

DETAILED DESCRIPTION OF THE INVENTION

Figure 1:
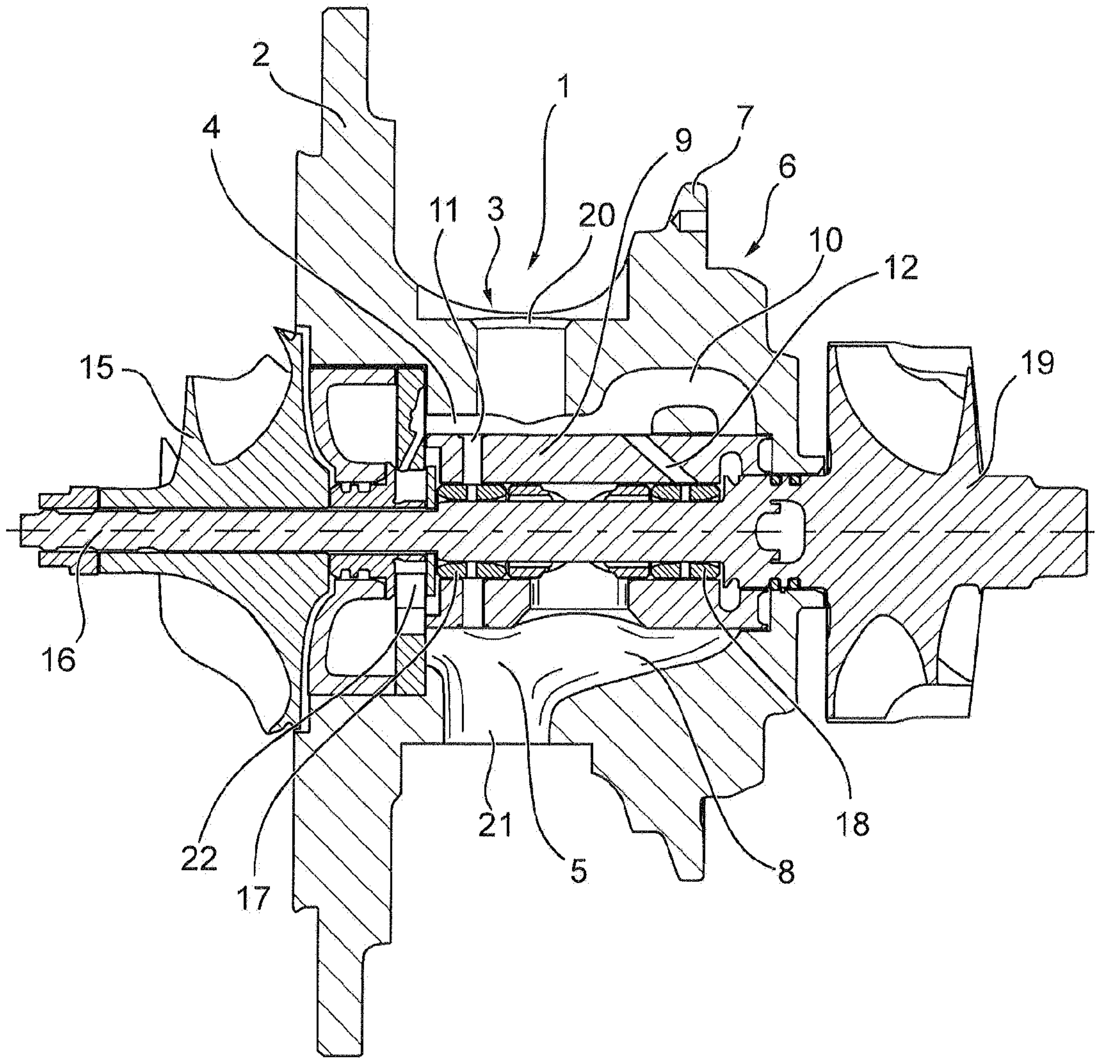
FIG. 1 shows a schematically slightly simplified illustration of a turbocharger body group provided with a bearing housing according to the invention.

FIG. 1 illustrates an exhaust-gas turbocharger body group which has a bearing housing 1 according to the invention. The body group also includes a shaft 16 on which the compressor wheel 15 is mounted at one side and the turbine wheel 19 is mounted at the other side so as to form a rotor. The shaft 16 is mounted in the bearing housing 1 by means of a compressor-side bearing arrangement 17 and a turbine-side bearing arrangement 18 together with an axial bearing 22. If a compressor housing and a turbine housing, which are not illustrated in FIG. 1, are added to said body group, this yields an exhaust-gas turbocharger, such that the present invention can also be described as an exhaust-gas turbocharger with a bearing housing 1 to be described in detail below.

Figure 2:
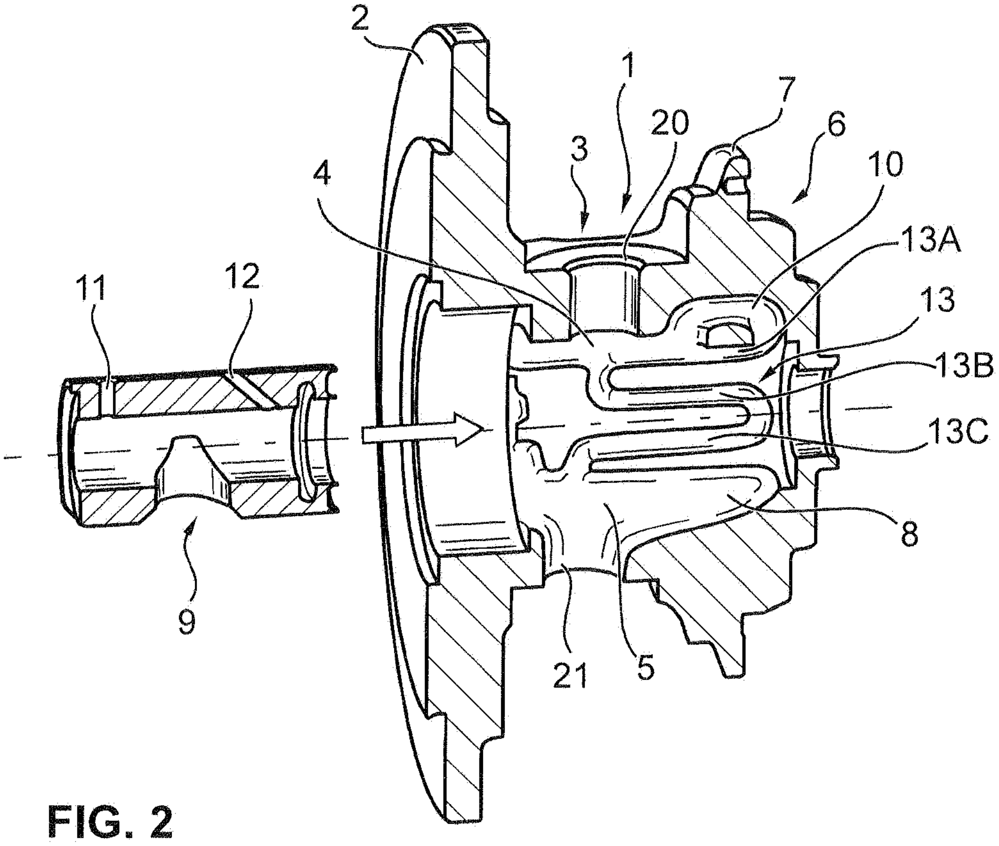
FIG. 2 shows a sectional illustration of the bearing housing according to the invention before the insertion of a bearing sleeve.

FIG. 2 illustrates the bearing housing 1 according to the invention before the insertion of a bearing sleeve 9. The bearing housing 1 comprises a compressor-side housing flange 2, a central housing section 3 which is integrally connected to the housing flange 2 and in which a first partial section 4 (see FIG. 1) of an oil chamber 5 is arranged, and a turbine-side housing section 6 which has a turbine-side housing flange 7 and in which a second partial section 8 (see FIG. 1) of the oil chamber 5 is arranged. The oil inlet 20 and the oil outlet 21 can also be seen from said illustration.

The central housing section 3 and the turbine-side housing section 6 are formed in one piece, and the bearing sleeve 9, which forms a separate component, is inserted in the central housing section 3 and turbine-side housing section 6. The advantage of said arrangement is that the bearing sleeve 9 and the two housing sections 3 and 6 together delimit the oil chamber 5.

Figure 3:
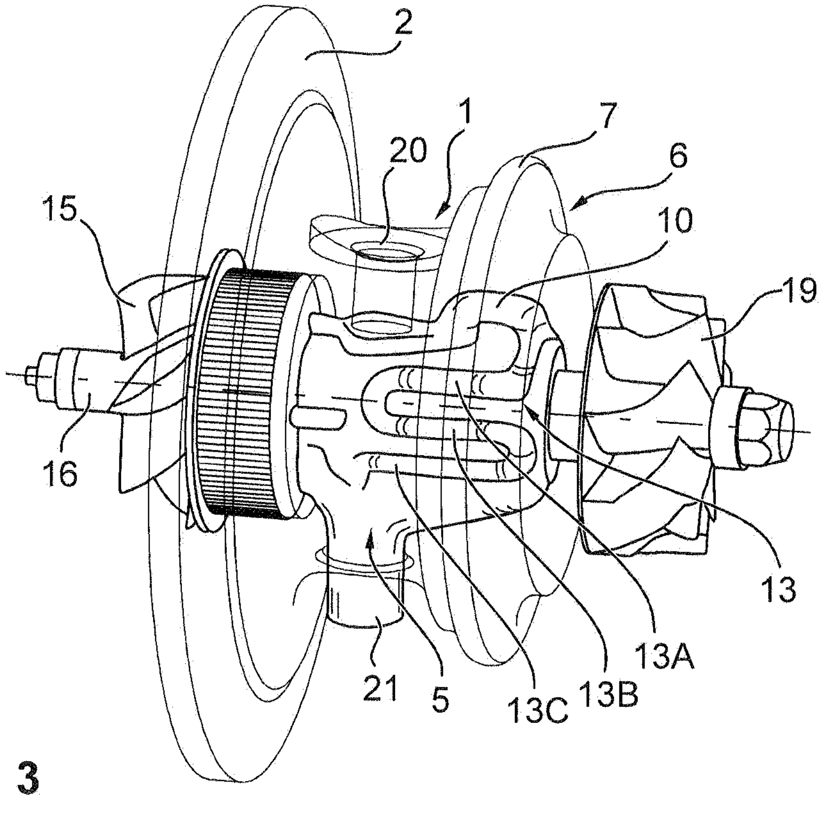
FIG. 3 shows a perspective illustration of the bearing housing according to the invention after the insertion of the bearing sleeve and the assembly of a rotor.

It can also be seen from FIGS. 1 to 3 that, in said embodiment, the oil chamber 5 is connected via an overflow 10 to an oil cooling duct 13. As is also shown in FIG. 1, the bearing sleeve 9 is provided with oil inlet ducts 11, 12. The oil cooling duct 13 can have an associated cross-sectional area. A throughflow rate in the oil cooling duct 13 can be determined by the cross-sectional area of the oil cooling duct 13.

The embodiment of the bearing housing in FIGS. 1 to 3 has the overflow 10 which branches off from the oil chamber 5 and leads to the oil cooling duct 13. In the exemplary embodiment illustrated in the figures, said oil cooling duct 13 has three duct sections 13A, 13B and 13C which run in a meandering fashion primarily in the turbine-side housing section 6 so as to allow the bearing housing 9 to be shielded from the hot turbine side. This can be seen in particular from FIG. 3.

FIGS. 2 and 3 also show that the final duct section 13C opens out in the oil outlet 21.

Figure 4:
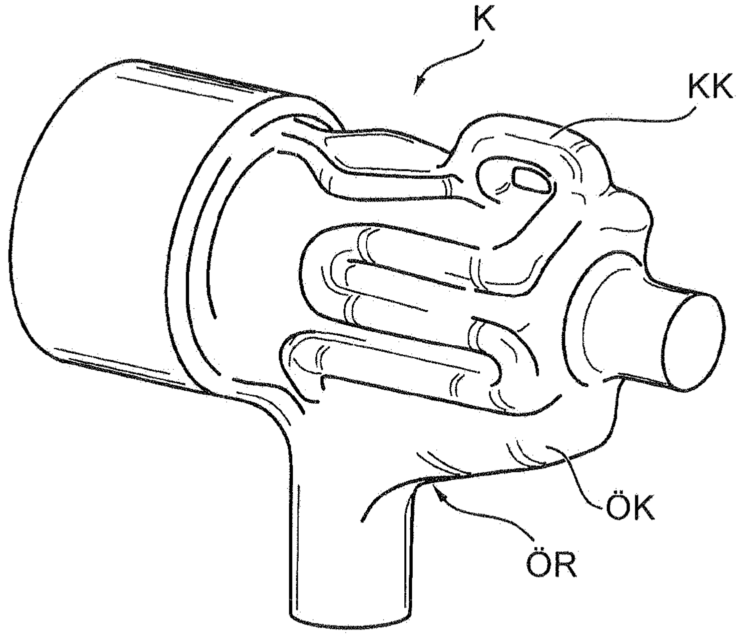
FIG. 4 shows a perspective illustration of a core for producing the bearing housing according to the invention.

FIG. 4 shows, in a perspective illustration, a core K for the manufacture of the bearing housing 1, which core has an oil chamber core ÖR which is divided into an oil core ÖK and a cooling duct core KK which, in the fully cast bearing housing 1, yield the above-described design of the oil chamber 5 and of the oil cooling duct 13, as can be seen directly from the illustration of FIG. 4.

Figure 5:
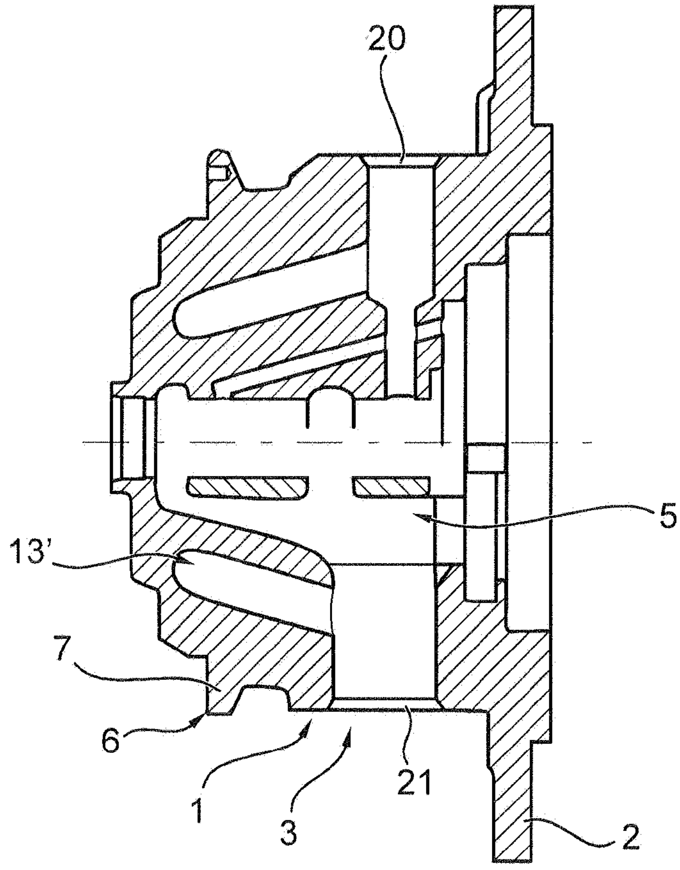
FIG. 5 shows an illustration, corresponding to FIG. 1, of an alternative bearing housing.

FIG. 5 illustrates an alternative embodiment of the bearing housing 1, in which all the parts which correspond to those in FIGS. 1 to 3 are provided with the same reference symbols. In contrast to the two-part embodiment of FIGS. 1 to 3, a single-part bearing housing 1 is provided here which has an oil cooling duct 13' which, as shown in FIG. 5, branches off from the oil inlet 20 and runs predominantly in the turbine-side housing section 6, in order, in this case too, to permit thermal shielding from the hot turbine side. The oil cooling duct 13' opens out in the oil outlet 21, as can be seen directly from FIG. 5. The oil cooling duct 13' can be arranged annularly around the oil chamber 5.

To supplement the above disclosure, reference is explicitly made to the diagrammatic illustration of the invention in FIGS. 1 to 5.

LIST OF REFERENCE SYMBOLS

1 Bearing housing
2 Compressor-side housing flange
3 Central housing section
4 First partial section
5 Oil chamber
6 Turbine-side housing section
7 Turbine-side housing flange
8 Second partial section
9 Bearing sleeve
10 Overflow
11, 12 Oil inflow ducts
13, 13' Oil cooling duct
13A, B, C Duct sections
15 Compressor wheel
16 Shaft
17 Bearing arrangement
18 Turbine-side bearing arrangement
19 Turbine wheel
20 Oil inlet
21 Oil outlet
22 Axial bearing
K Core
ÖK Oil core
ÖR Oil chamber
KK Cooling duct core

The invention claimed is:

1. A bearing housing (1) of an exhaust-gas turbocharger, comprising:

a compressor-side housing flange (2), a central housing section (3) which is integrally connected to the housing flange (2) and in which is arranged a first partial section (4) of an oil chamber (5) which has an oil inlet (20) and an oil outlet (21), and a turbine-side housing section (6) which has a turbine-side housing flange (7) and in which is arranged a second partial section (8) of the oil chamber (5), wherein the central and turbine-side housing sections (3, 6) are provided with an oil cooling duct (13; 13'), the oil cooling duct being in direct fluid communication with the oil chamber to receive oil therefrom, the oil cooling duct being in direct fluid communication with the oil outlet to supply oil thereto.

2. The bearing housing (1) as claimed in claim 1, wherein the oil cooling duct (13) is in direct fluid communication with the oil chamber (5) by an overflow (10).

3. The bearing housing (1) as claimed in claim 2, wherein the oil cooling duct (13) has three duct sections (13A, 13B, 13C) which run in a meandering fashion from the overflow (10) to the oil outlet (21).

4. The bearing housing (1) as claimed in claim 2, wherein the oil cooling duct (13) includes a plurality of duct sections, and wherein the oil cooling duct (13) runs in a meandering fashion from the overflow (10) to the oil outlet (21).

5. A bearing housing (1) of an exhaust-gas turbocharger, comprising:

a compressor-side housing flange (2), a central housing section (3) which is integrally connected to the housing flange (2) and in which is arranged a first partial section (4) of an oil chamber (5) which has an oil inlet (20) and an oil outlet (21), and a turbine-side housing section (6) which has a turbine-side housing flange (7) and in which is arranged a second partial section (8) of the oil chamber (5), wherein the central and turbine-side housing sections (3, 6) are provided with an oil cooling duct (13; 13'), wherein the oil cooling duct (13') branches off from the oil inlet (20) to permit flow of oil from the oil inlet (20) to the oil cooling duct (13'), and wherein the oil cooling duct (13') opens out into the oil outlet (21).

6. The bearing housing (1) as claimed in claim 5, wherein the oil cooling duct (13') is arranged annularly around the oil chamber.

7. The bearing housing (1) as claimed in claim 1, wherein the cooling duct (13, 13') has an associated cross-sectional area, and wherein a throughflow rate in the oil cooling duct (13, 13') is determined by the cross-sectional area of the oil cooling duct (13, 13').

8. The bearing housing (1) as claimed in claim 1, further including a separate bearing sleeve (9), wherein the bearing sleeve (9) is received in the central housing section (3) and the turbine-side housing section (6).

9. The bearing housing (1) as claimed in claim 8, wherein the bearing sleeve (9) separates the oil cooling duct (13') from the oil chamber (5).

10. A bearing housing (1) of an exhaust-gas turbocharger, comprising:

a compressor-side housing flange (2), a central housing section (3) which is integrally connected to the housing flange (2) and in which is arranged a first partial section (4) of an oil chamber (5) which has an oil inlet (20) and an oil outlet (21), a turbine-side housing section (6) which has a turbine-side housing flange (7) and in which is arranged a second partial section (8) of the oil chamber (5), wherein the central and turbine-side housing sections (3, 6) are provided with an oil cooling duct (13; 13'); and a separate bearing sleeve (9), wherein the bearing sleeve (9) is received in the central housing section (3) and the turbine-side housing section (6).

11. The bearing housing (1) as claimed in claim 10, wherein the bearing sleeve (9) separates the oil cooling duct (13') from the oil chamber (5).

12. The bearing housing (1) as claimed in claim 10, wherein the oil cooling duct (13) includes a plurality of duct sections.

13. The bearing housing (1) as claimed in claim 10, wherein the oil cooling duct (13) runs in a meandering fashion.

14. The bearing housing (1) as claimed in claim 10, wherein the oil cooling duct (13) is in fluid communication with the oil chamber (5) by an overflow (10).

* * * * *

UNITED STATES PATENT AND TRADEMARK OFFICE

CERTIFICATE OF CORRECTION

PATENT NO. : 8,757,885 B2
APPLICATION NO. : 13/816521
DATED : June 24, 2014
INVENTOR(S) : Johannes Hornbach and Oliver Schumnig It is certified that error appears in the above-identified patent and that said Letters Patent is hereby corrected as shown below:

Title Page,

Item (75) Inventors should read: Johannes Hornbach, Frankenthal (DE)
Oliver Schumnig, Gundersheim (DE)

Signed and Sealed this
Twenty-first Day of June, 2016

Michelle K. Lee

Michelle K. Lee
*Director of the United States Patent and Trademark Office*